US012448749B2

United States Patent
Hassavari

(10) Patent No.: US 12,448,749 B2
(45) Date of Patent: Oct. 21, 2025

(54) ANCHOR ASSEMBLY

(71) Applicant: Nader Hassavari, Trondheim (NO)

(72) Inventor: Nader Hassavari, Trondheim (NO)

( * ) Notice: Subject to any disclaimer, the term of this patent is extended or adjusted under 35 U.S.C. 154(b) by 128 days.

(21) Appl. No.: 18/245,216

(22) PCT Filed: Sep. 10, 2021

(86) PCT No.: PCT/NO2021/050186
§ 371 (c)(1),
(2) Date: Mar. 14, 2023

(87) PCT Pub. No.: WO2022/055358
PCT Pub. Date: Mar. 17, 2022

(65) Prior Publication Data
US 2023/0392337 A1 Dec. 7, 2023

(30) Foreign Application Priority Data
Sep. 14, 2020 (NO) .................................. 20201005

(51) Int. Cl.
*E02D 5/80* (2006.01)
*E02D 5/38* (2006.01)
(Continued)

(52) U.S. Cl.
CPC .............. *E02D 5/803* (2013.01); *E02D 5/38* (2013.01); *E02D 5/54* (2013.01); *E02D 13/00* (2013.01); *E02D 13/04* (2013.01); *E02D 27/50* (2013.01); *E02D 27/525* (2013.01); *E02D 2250/0023* (2013.01); *E02D 2600/30* (2013.01)

(58) Field of Classification Search
CPC .. E02D 5/54; E02D 5/80; E02D 5/803; E02D 27/525
See application file for complete search history.

(56) References Cited

U.S. PATENT DOCUMENTS 3,342,444 A * 9/1967 Nelson ................ E04H 12/2215
52/165
3,479,829 A 11/1969 Goodman
(Continued)

FOREIGN PATENT DOCUMENTS

CN 111254917 A 6/2020
EP 0097525 A2 1/1984
(Continued)

OTHER PUBLICATIONS

International Search Report and Written Opinion mailed Dec. 1, 2021 for International Patent Application No. PCT/NO2021/050186.

*Primary Examiner* — Frederick L Lagman
(74) *Attorney, Agent, or Firm* — Alix, Yale & Ristas, LLP

(57) ABSTRACT

Anchor assembly for arrangement in seabed comprising a main tube provided with foldable wings movably arranged in recesses of the main tube by being hinged in upper end of the recesses, which wings in initial position is aligned with outer surface of the main tube, where the foldable wings are provided with a centered curved main support element extending in a plane perpendicular to inner surface of the wing and wherein rear part of the main support element is provided with a notch, constriction or recess determining the number of degrees the wing is to exhibit in relation to the main tube in deployed state.

19 Claims, 12 Drawing Sheets

(51) Int. Cl.
*E02D 5/54* (2006.01)
*E02D 13/00* (2006.01)
*E02D 13/04* (2006.01)
*E02D 27/50* (2006.01)
*E02D 27/52* (2006.01)

(56) References Cited

U.S. PATENT DOCUMENTS

| | | | | |
|---|---|---|---|---|
| 3,924,371 | A * | 12/1975 | Kidwell | E02D 5/803 |
| | | | | 52/162 |
| 4,547,106 | A * | 10/1985 | Lipsker | E02D 5/803 |
| | | | | 405/262 |
| 4,882,891 | A * | 11/1989 | Sero | E02D 5/74 |
| | | | | 52/741.15 |
| 5,984,587 | A * | 11/1999 | Odle | E01F 9/685 |
| | | | | 52/153 |
| 9,394,663 | B2 * | 7/2016 | Berger | E04H 12/2215 |
| 9,611,609 | B2 * | 4/2017 | Kelleher | E02D 7/02 |
| 11,828,035 | B2 * | 11/2023 | Yoo | E02D 5/54 |
| 2005/0232707 | A1 * | 10/2005 | Reinert, Sr. | E02D 27/42 |
| | | | | 405/232 |
| 2014/0053767 | A1 * | 2/2014 | O'loughlin | E02D 5/80 |
| | | | | 114/295 |
| 2016/0024739 | A1 * | 1/2016 | Kelleher | F24S 25/617 |
| | | | | 405/253 |
| 2017/0144731 | A1 * | 5/2017 | De Carvalho E Silva | |
| | | | | B63B 21/26 |
| 2020/0283980 | A1 * | 9/2020 | Plotkin | E02D 5/54 |
| 2021/0372071 | A1 * | 12/2021 | Yoo | E02D 5/803 |

FOREIGN PATENT DOCUMENTS

| | | |
|---|---|---|
| GB | 11138 | 5/1910 |
| GB | 2100314 A | 12/1982 |
| JP | 5910613 A | 1/1984 |
| KR | 20120013668 A | 2/2012 |
| NO | 20150830 A1 | 2/2016 |
| WO | 2004092486 A1 | 10/2004 |
| WO | 2012121501 A2 | 9/2012 |
| WO | 2012150372 A1 | 11/2012 |

* cited by examiner

ANCHOR ASSEMBLY

BACKGROUND

The disclosure is related to an anchor assembly, and especially related to an anchor assembly for arrangement into the seabed.

Over time, there have been made many attempts to make anchoring solutions, but none of these are capable of handling extreme loads.

In WO12121501 A2 is described an apparatus for increasing the resistance force of piles arranged into the seabed. It is described an apparatus in the form of a massive or hollow pile that is inserted into the seabed, where on the pile surface is arranged at least one wing, which is rotatably arranged to the pile surface. When a pile is inserted into the seabed, the wing is folded in such that it lies against the surface of the pile, but when the pile is pulled upwards, the wing deploys outwards and therethrough creates a resistance force for the pile.

The main disadvantage of this solution is that the pile must further down into the seabed and next pulled up again before the wings have an effect. Further, the wings will not have the desired purpose if the seabed consists of relatively hard masses, as the hole itself after insertion of the pile will be so firm that the wings, when the pile is pulled upwards again, will not deploy. Further, due to the wings being arranged on the surface of the pile, there is a great danger that masses will aggregate into the wings and preventing the wings from deploying when the pile is pulled upwards again. Further, the fastening point of the wings at the pile surface may be damaged when the pile is inserted into the seabed and the wings will thus not have the desired effect. The wings will further, as they are arranged on the surface of the pile, not be able to exhibit an angle that is larger than maximum 45 degrees, something that means that they will not provide a sufficient areal with a sufficient angle in relation to the pile to retain the pile if it is applied a large force upwards.

From WO2004092486 it is known an anchor assembly comprising an outer tube with foldable wings, wherein the outer tube is provided with recesses in longitudinal direction where the foldable wings are movably arranged by that being hinged at upper end of the recesses. The wings are in initial position positioned inside the outer tube, where the anchor assembly further comprises an inner tube which exhibits an outer diameter that is smaller than the inner diameter of the outer tube, which inner tube is arranged to be inserted into the outer tube and therethrough move the wings out through the recesses, to an outer position where the wings exhibit an angle being mainly perpendicular to the longitudinal direction of the outer tube.

From WO2012150372 it is known an anchor assembly with a number of hinged wings that can be moved out through recesses in an outer tube.

In GB191011138 and U.S. Pat. No. 3,479,829 are similar solutions for anchor assemblies with hinged wings in recesses described, which wings are moved out from the outer tube when an inner tube is inserted into the outer tube.

None of these solutions are solutions that can be adapted to the ground where the anchor assembly is to be arranged and neither is capable of withstanding extreme loads. They further suffer from that they lack strength and security in relation to maintaining the wings in deployed position. It is well known for a skilled person that concrete deteriorates over time and that this alone is not a secure way to maintain the wings in deployed position.

There is accordingly a need for a more robust and secure anchor assembly ensuring that the anchor assembly has sufficient resistance force against being pulled out of the seabed and at the same time is capable of handling extreme loads.

SUMMARY

Provided herein is an anchor assembly partly or entirely solving the mentioned disadvantages of prior art.

Also provided is an anchor assembly designed to handle extreme loads.

Also provided is an anchor assembly where it is possible to adapt the angle of the wings in relation to the ground the anchor assembly is to be installed in.

Also provided is an anchor assembly with increased resistance against tension and pressure loads of the anchor assembly, compared to prior art.

Also provided is an anchor assembly exhibiting increased resistance against pulling forces from anchoring means, compared to prior art.

Also provided is an anchor assembly with increased strength and secure locking of the wings in deployed position, compared to prior art.

The disclosure provides an anchor assembly, especially suitable for installation into the seabed.

The disclosed anchor assembly comprises a main tube provided with foldable wings movably arranged in recesses of the main tube by being hinged in upper end of the recesses, which wings in initial position are aligned with exterior surface of the main tube.

In accordance with the disclosed embodiments, the foldable wings are provided with a centered curved main support element extending in a plane perpendicular to inner surface of the wing and wherein rear part of the main support element is provided with a notch, constriction or recess determining the number of degrees the wing is to exhibit in relation to the main tube in deployed state.

In the anchor assembly disclosed herein, the wing is arranged such that when the wing is moved out to deployed state with a desired angle, the notch, constriction or recess will come into engagement with exterior surface of the main tube, such that the wing becomes locked in this position.

In accordance with a further embodiment of the anchor assembly, the wings are further provided with two additional support elements, arranged on each side of the main support element, which support elements extend in longitudinal direction on rear side of the wing and have an extension in longitudinal direction that is longer than the wing, so that they exhibit a part thereof extending beyond the wing, in a direction upwards in the main tube when the wings are in closed position, and horizontally inwards toward center of the main tube when the wings are in deployed position, but not in contact with the support elements of an opposite wing.

In a further embodiment of the anchor assembly, the support elements are adapted a desired angle for deployment of the wing, such that when the wing is in deployed position with a desired angle, the support elements are positioned horizontally interior the main tube to form an engagement surface for a locking device.

According to a further embodiment, the support elements are arranged with a distance between them allowing insertion of a hammer head of a hammer which is to move the wings from closed position to deployed position.

In accordance with a further embodiment, the anchor assembly comprises a locking device arranged for locking the wings in deployed position and therethrough increase the strength and resistance of the wing at extreme loads, by that the locking device is preventing the wing from being ripped out at the hinged area at upper part of the recess at extreme loads.

According to one embodiment of the locking device, it is formed by a disc-shaped locking plate having an exterior circumference being smaller than the interior circumference of the main tube and being larger than the distance between the mentioned support elements when these are in horizontal position. The locking plate is arranged to bear against the mentioned support elements when these are in horizontal position and by that lock the wings in deployed position via the support elements.

For further reinforcement and security, the locking device in a further embodiment comprises a lock block arranged to the lower side of the mentioned locking plate via a connection element positioning the lock block at a distance from the locking plate, so that the lock block is positioned between the main support elements of diagonally opposite wings when these are in deployed position.

According to one embodiment, the lock block has an extension in longitudinal direction corresponding to the distance between the main support elements, depending on angle of the wings in deployed position, of two diagonally opposite wings for therethrough to lock the wings from forcing back into the main tube at extreme loads and/or preventing the wings from being ripped out, as mentioned above. The lock block further has a width adapted the distance between the mentioned support elements of each wing so that it can be guided down between these and into engagement with the mentioned main support elements.

In accordance with a further embodiment, the locking plate is further at upper side thereof provided with upwards protruding reinforcing elements extending perpendicularly upwards from the mentioned locking plate, a certain distance upwards in the main tube for engagement with concrete filled into the main tube after the anchor assembly is installed into the seabed.

According to a further embodiment, the locking plate is provided with at least one through hole to prevent air from being captured below the locking plate when concrete is filled in the main tube and flowing down under the locking plate along the sides and through the hole(s). This will also contribute in strengthening the locking itself of the wing in deployed position.

In accordance with a further embodiment of the anchor assembly disclosed herein, the main tube is interiorly provided with a number of small protruding elements distributed around on the interior surface of the main tube to prevent concrete filled in the main tube from sliding out at extreme loads.

According to one embodiment, the main tube is provided with guide means extending in longitudinal direction of the main tube, at interior surface thereof, which guide means are used to guide the locking device in correct position downwards in the main tube and/or guidance of a hammer in correct position downwards to knock out the wings, where the locking device and/or hammer is provided with corresponding guide means.

In accordance with one embodiment, the anchor assembly comprises anti-pressure means extending in longitudinal direction of the elongated main tube and anti-tension means extending in longitudinal direction of the elongated main tube, where the anti-pressure means and anti-tension means are arranged diagonally to the elongated main tube.

According to a further embodiment of the anchor assembly disclosed herein, it comprises a resistance plate arranged at upper part of the main tube, which resistance plate is arranged in a parallel vertical plane of the main tube, which resistance plate has an extension in width direction that is longer than the diameter of the main tube. The resistance plate is arranged to the main tube via a number of support plates extending from rear side of the resistance plate and to the main tube, where the anchor assembly is arranged down into the seabed such that the resistance plate, by its width direction, is arranged transversally of pulling direction of anchoring means arranged to the anchor assembly.

In accordance with one embodiment of the resistance plate, it is shaped so that it at lower part thereof narrows in so that a tip is formed reducing the resistance when the anchor assembly is to be inserted down into the seabed.

In accordance with the disclosure, the resistance plate may have different shape and size, hereunder extension in longitudinal and/or width direction of the anchor assembly, depending on desired properties for the anchor assembly.

According to one embodiment of the anchor assembly, it comprises a lid that detachably can be arranged to upper end of the main tube, which lid is provided with at least one hole for filling of concrete into the main tube and to which lid is arranged an anchoring hook extending through the lid and having a strong and long reinforced part extending far down in the main tube for engagement with concrete filled in the main tube.

In accordance with a further embodiment, the anchor assembly is provided with hooks for handling of the anchor assembly in connection with deployment from installation vessel and for adjustment of the position of the anchor assembly, such that the resistance plate is positioned with its width direction transversally of pulling direction of anchoring means when the anchor assembly is installed into the seabed.

According to a further embodiment, the anchor assembly comprises a hammer for knocking out the wings from closed position to deployed position, which hammer is formed by an elongated main body and a hammer head at lower end adapted for engagement with the wings.

In accordance with one embodiment of the anchor assembly, the hammer head has a cross-sectional shape adapted the support elements of the wings, such that the hammer head can be guided between the support elements and into engagement with the main support element to knock out the wings from the main tube and to deployed position with desired angle.

According to a further embodiment of the anchor assembly, the hammer head has a width adapted the distance between the main support elements after the wings have been knocked out with desired angle and therethrough forms a key knocking out the wings to a desired angle.

In accordance with a further embodiment of the present invention, the anchor assembly is filled with concrete after being installed into the seabed and the wings deployed to desired angle and optionally with arrangement of reinforcing means in the main tube before filling with concrete.

In other words, provided herein is an anchor assembly for arrangement into the seabed exhibiting higher resistance forces against forces affecting an anchor assembly than what is achievable with prior art.

It is further achieved an anchor assembly ensuring that the wings are deployed in a correct manner and remains in deployed position.

It is further achieved an anchor assembly capable of withstanding extreme loads without deteriorating in any manner.

Further preferable features and advantageous details of the present invention will appear from the following example description.

BRIEF DESCRIPTION OF THE DRAWINGS

The present invention will below be described in further detail with references to the attached drawings, where.

DETAILED DESCRIPTION

Figure 1A:
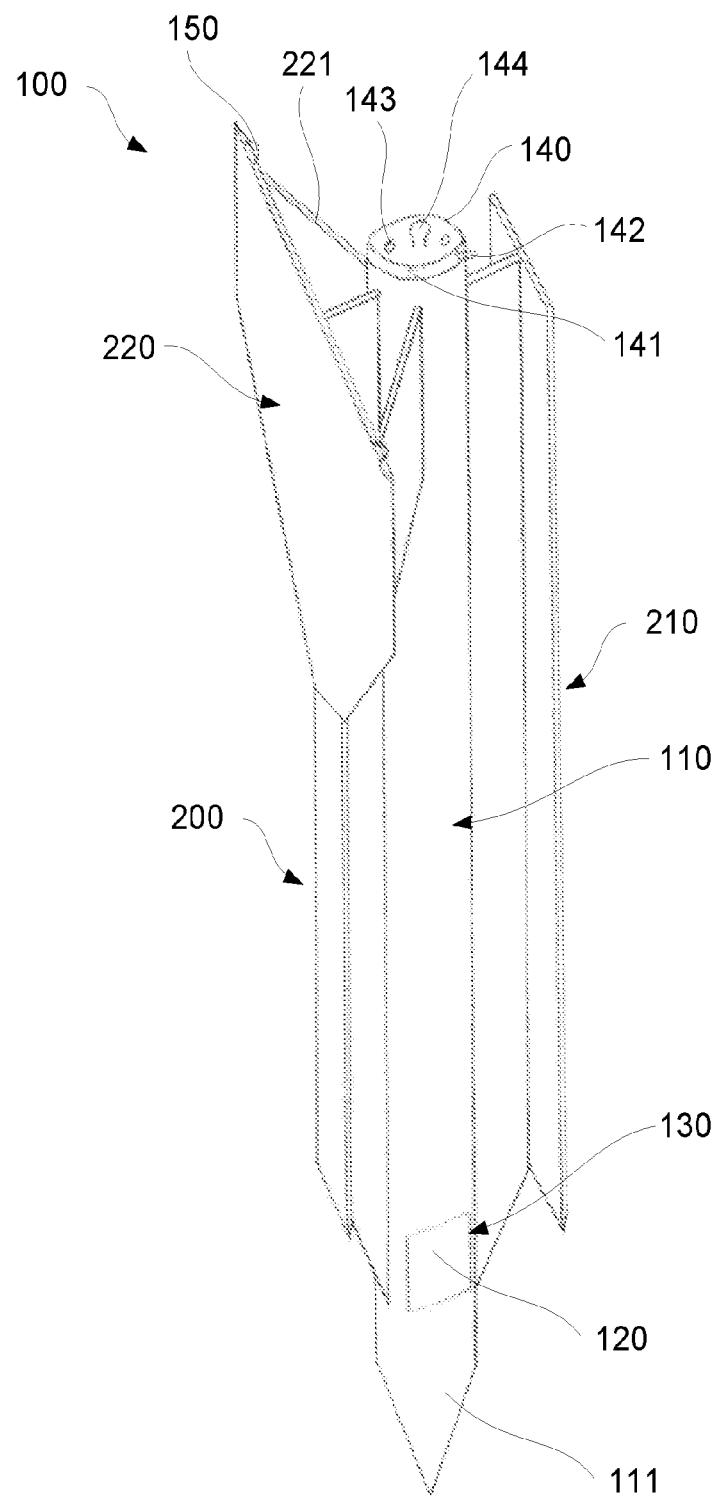
FIGS. 1A and 1B are principle drawings of an anchor assembly according to the disclosed embodiments.
Figure 1B:
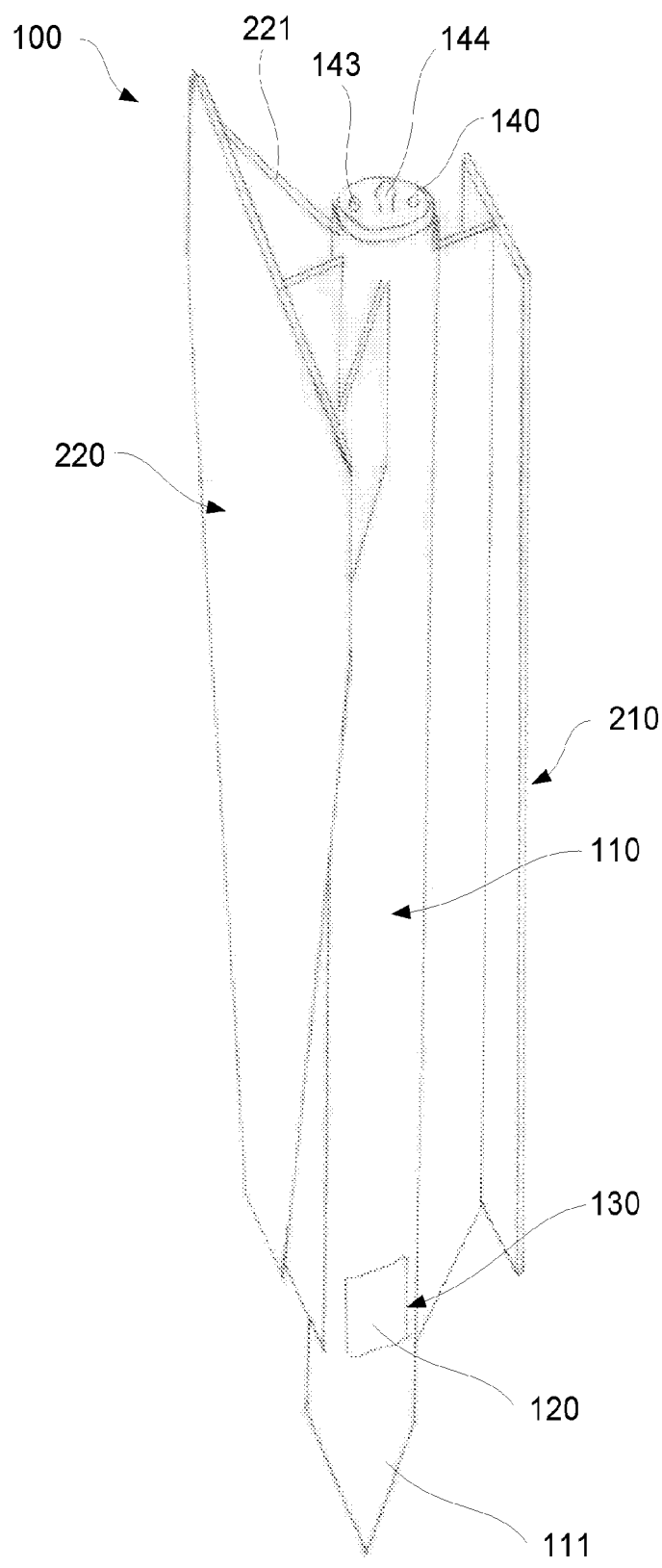
Figure 2:
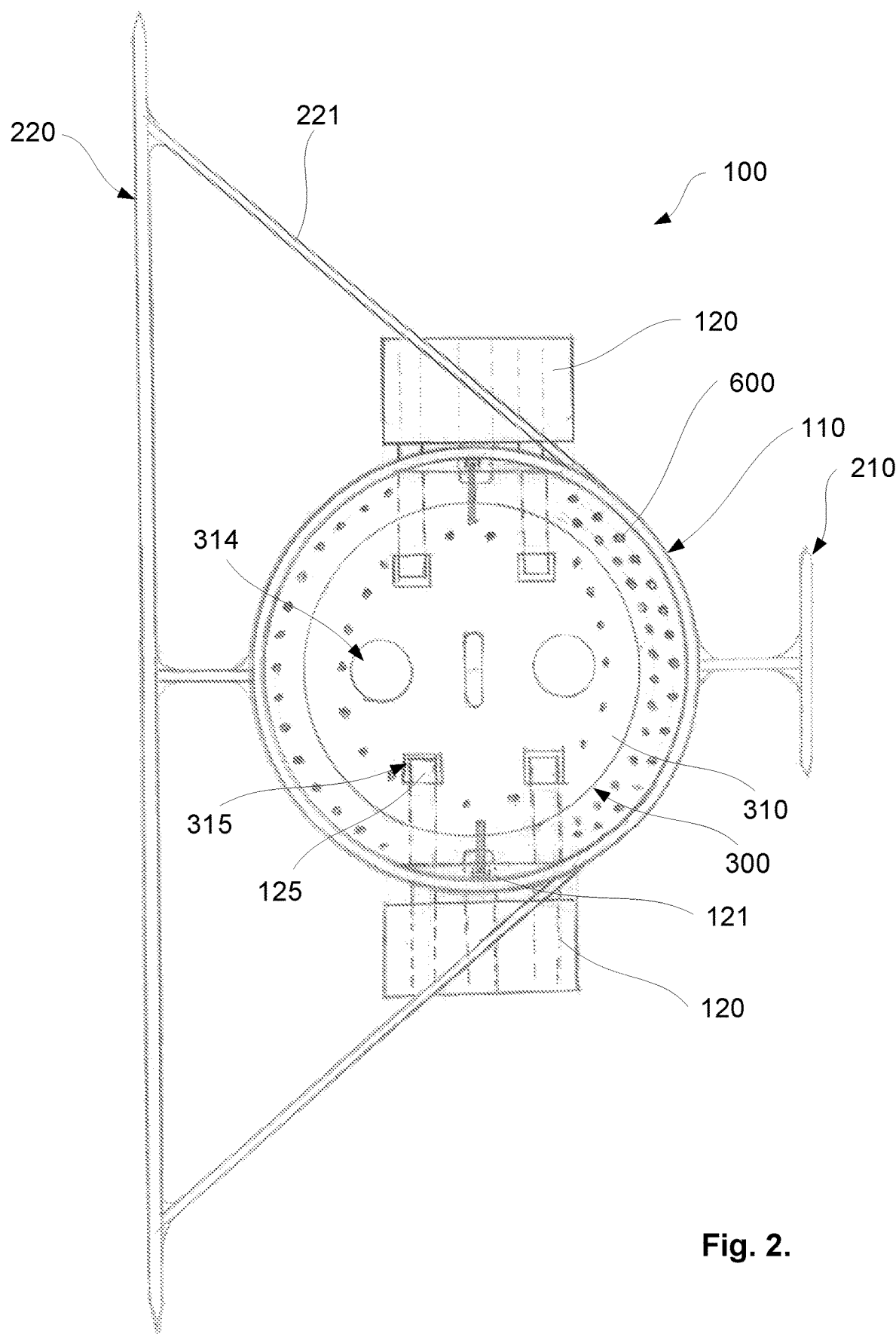
FIG. 2 is a principle drawing of the anchor assembly in FIGS. 1A and 1B, seen from above, showing interior and exterior details.

Reference is now made to FIGS. 1A, 1B and 2 showing principle drawings of an embodiment of the disclosed anchor assembly 100, seen from the side and above, respectively. The anchor assembly 100 is formed by an elongated main tube 110, where the elongated main tube 110 is provided with at least two foldable wings 120 arranged in recesses 130 of the elongated main tube 110, which recesses 130 are adapted the size of the wings 120. The foldable wings 120 are preferably movably arranged in upper part of the recesses 130 by means of at least one hinge 121 and a shaft, see FIGS. 2-4, 6 and 8-9, which will be described in further detail below. In initial position, the foldable wings 120 are positioned interior in the elongated main tube 110. The number of wings 120 and the location of the wings 120 in longitudinal direction of the elongated main tube 110 and along the circumference of the elongated main tube 110, and the size of the wings 120, are adapted the relevant application for the anchor assembly 100, as well as also the ground conditions where the anchor assembly 100 is to be used. In the example shown in the Figures, the anchor assembly 100 is provided with two diagonally arranged wings 120, in lower part of the elongated main tube 110.

The elongated main tube 110 is further, at lower end, preferably shaped with a tip 111 to ease the insertion of the anchor assembly into the seabed.

The anchor assembly 100 further comprises anti-pressure means 200 extending in longitudinal direction of the elongated main tube 110 and anti-tension means 210 extending in longitudinal direction of the elongated main tube 110. According to one embodiment, the anti-pressure means 200 and anti-tension means 210 are arranged diagonally to the elongated main tube 110 and preferably so that they do not coincide with the wings 120, but instead are arranged such that they are positioned in a perpendicular plane in relation to the wings 120.

The anti-pressure means 200 and anti-tension means 210 are, e.g., formed by beam-like structure being, e.g., T-shaped or H-shaped profiles and which in addition provides a surface extending in longitudinal direction of the main tube 110 with a distance from the main tube 110. Other profiles achieving the same can also be used.

Accordingly, the anti-pressure means 200 will increase the pressure resistance and bending resistance especially around the center of the main tube 110, while the anti-tension means 210 will increase the tension resistance and bending resistance especially around the center of the main tube 110. In this manner, one will avoid that the main tube 110 will breach during extreme loads. It is further advantageous that the anti-pressure means 200 and anti-tension means 210 exhibit tapered ends at lower edge for reduced resistance when the anchor assembly 100 is to be inserted into the seabed.

Figure 5A:
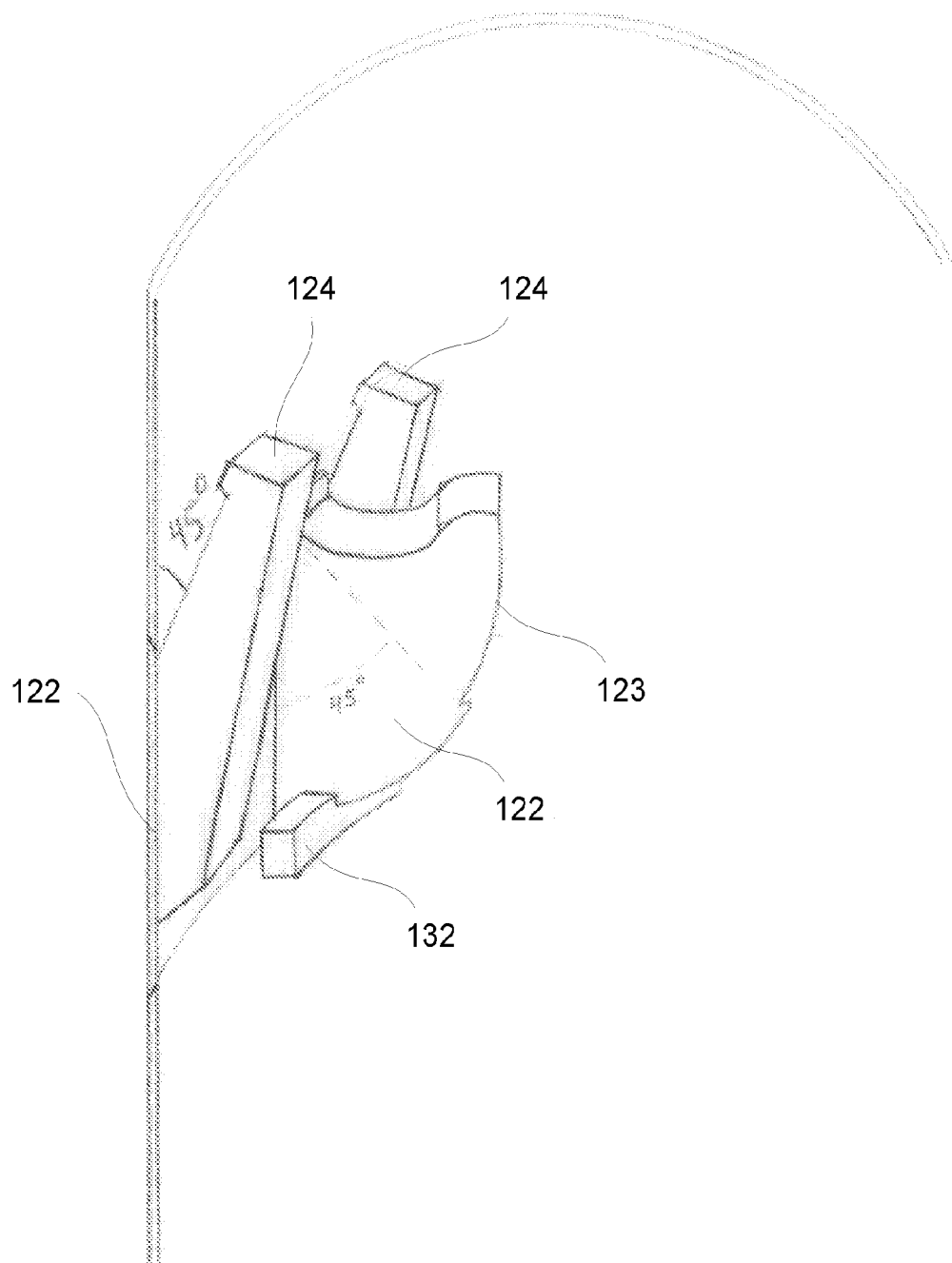
Figure 5B:
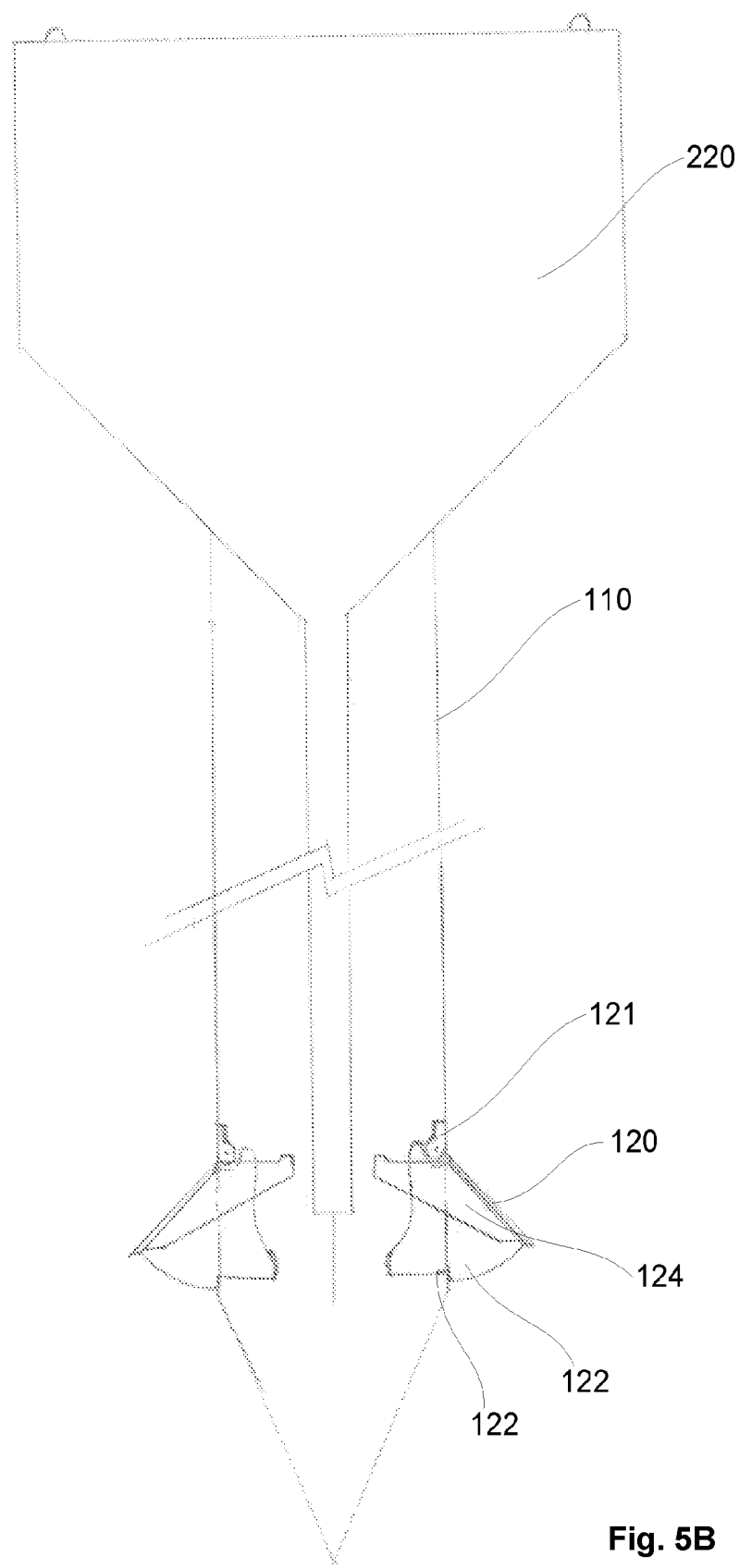

As disclosed herein, the anchor assembly 100 further comprises a resistance plate 220 arranged at upper part of the main tube 110, which resistance plate 220 is arranged in a parallel vertical plane to the main tube 110. The resistance plate 220 has an extension in width direction that is longer than the diameter of the main tube 110 and is arranged to the main tube 110 via a number of support plates 221 extending from rear side of the resistance plate 220 and to the main tube 110. The resistance plate 220 is accordingly arranged with a distance from the main tube 110 and extending with a desired width and length downwards along the main tube 110. As shown in FIGS. 1A, 1B and 5B, the resistance plate is arranged above the anti-pressure means 200.

The resistance plate 220 is preferably shaped so that the lower part thereof narrows so that a tip is formed reducing the resistance when the anchor assembly 100 is to be inserted into the seabed.

The resistance plate 220 accordingly forms a front plate preventing the anchor assembly 100 from moving forwards during extreme loads.

As shown in FIGS. 1A and 1B, the disclosed resistance plate 220 may have different shape and size depending on the desired properties wanted for the anchor assembly 100. The resistance plate 220 in FIG. 1B, e.g., exhibits a longer extension in longitudinal direction of the anchor assembly 100 than the solution of FIG. 1A.

According to one embodiment of the anchor assembly 100 it further comprises a detachable lid 140, which detachably may be arranged to upper end of the main tube 110 by means of, e.g., mounting holes 141 in the main tube 110 and fixing bolts 142. The lid 140 is further provided with at least one hole 143 for filling of concrete in the main tube 110.

The lid is further provided with an anchoring hook 144 extending through the lid 140 and having a strong and long reinforced part extending far down in the main tube 110, preferably to close to center of the main tube 110. The anchoring hook 144 is under the lid 140 welded with reinforcements to maintain the hook and lid in place at extreme loads. After the lid 140 is positioned, the mentioned bolts 142 are used through the lid 140 and main tube 110 to securely hold the lid in place.

The mentioned holes 141 will also be used as connection points for arrangement of a powerful vibratory hammer for knocking the anchor assembly 100 down into the seabed before attachment of the lid 140.

The anchor assembly 100 is further provided with hooks 150 for handling of the anchor assembly 100 in connection with deployment from installation vessel. In the shown embodiment, the hooks 150 are arranged to upper end of the resistance plate 220, at distal ends thereof. By arranging ropes or wires to the hooks 150, the position of the anchor assembly 100 may be adjusted, so that it is positioned such that the resistance plate 220, with its width direction, is in transversal direction of the pulling direction of anchoring means after the anchor assembly 100 is installed into the seabed.

Figure 3A:
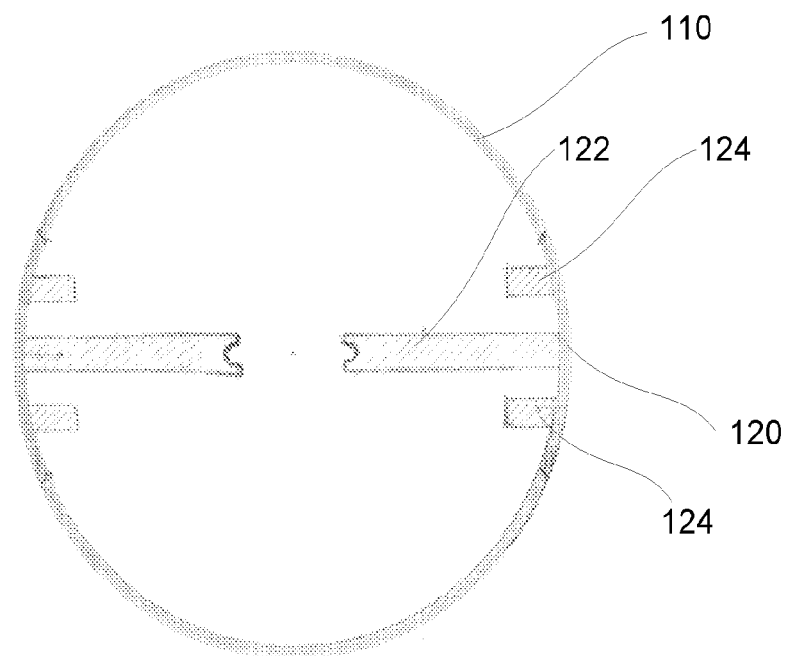
FIGS. 3A-3D are principle drawings of wings according to the disclosure.
Figure 3B:
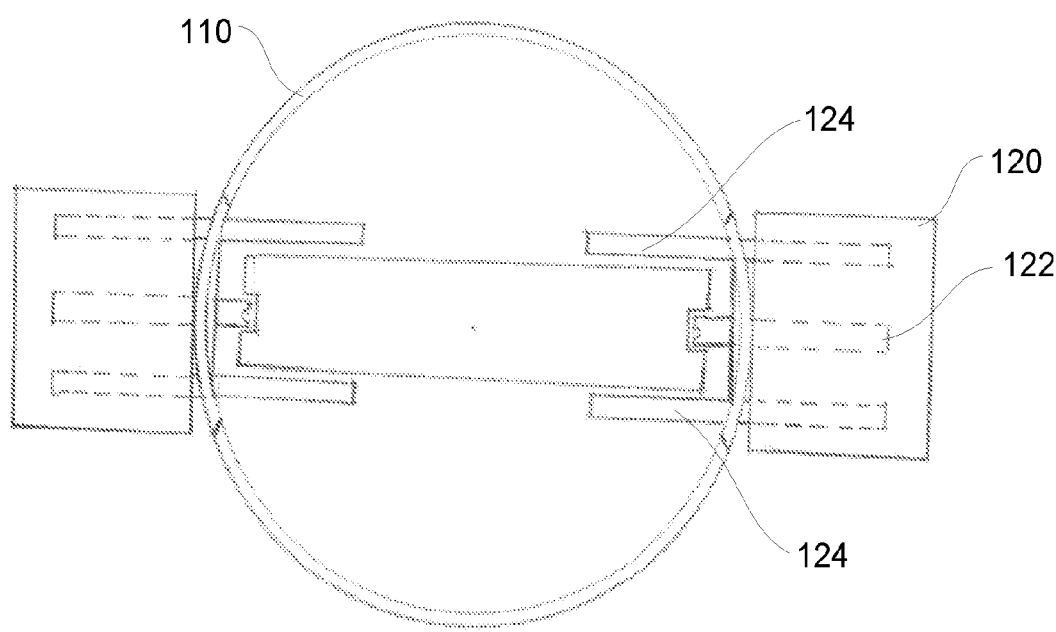

Reference is now made to FIGS. 2, 3A-3D, 4, 5A and 5B for description of further details regarding the wings 120. In FIGS. 2, 3B and 5B the wings 120 are shown in deployed position.

The wings 120 preferably exhibit a shape coinciding with the exterior circumference of the main tube 110, so that, when they are in closed position, they constitute a part of the exterior surface of the main tube 110.

As mentioned, the wings 120 are hinged 121 interior of the main tube 110. The wings 120 are further provided with a main support element 122, arranged centered to the wing 120. As shown in FIGS. 4-6 and 9, the main support element 122 is preferably curved and extending in a plane perpendicular to inner surface of the wings 120.

Figure 3C:
Figure 3D:
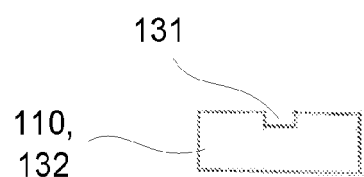
Figure 4:
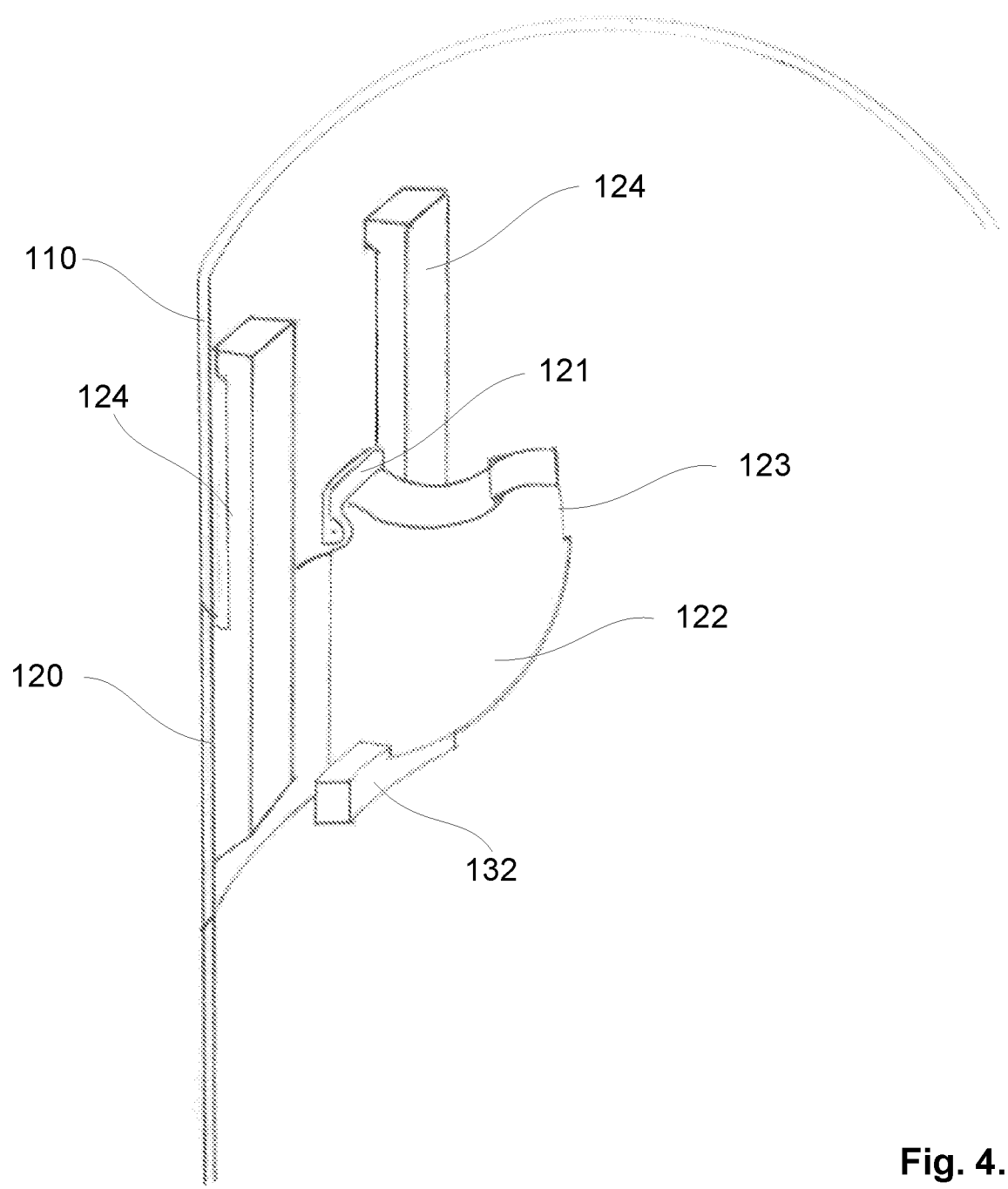
FIGS. 4, 5A and 5B are further principle drawings of wings according to the disclosure.
Figure 6:
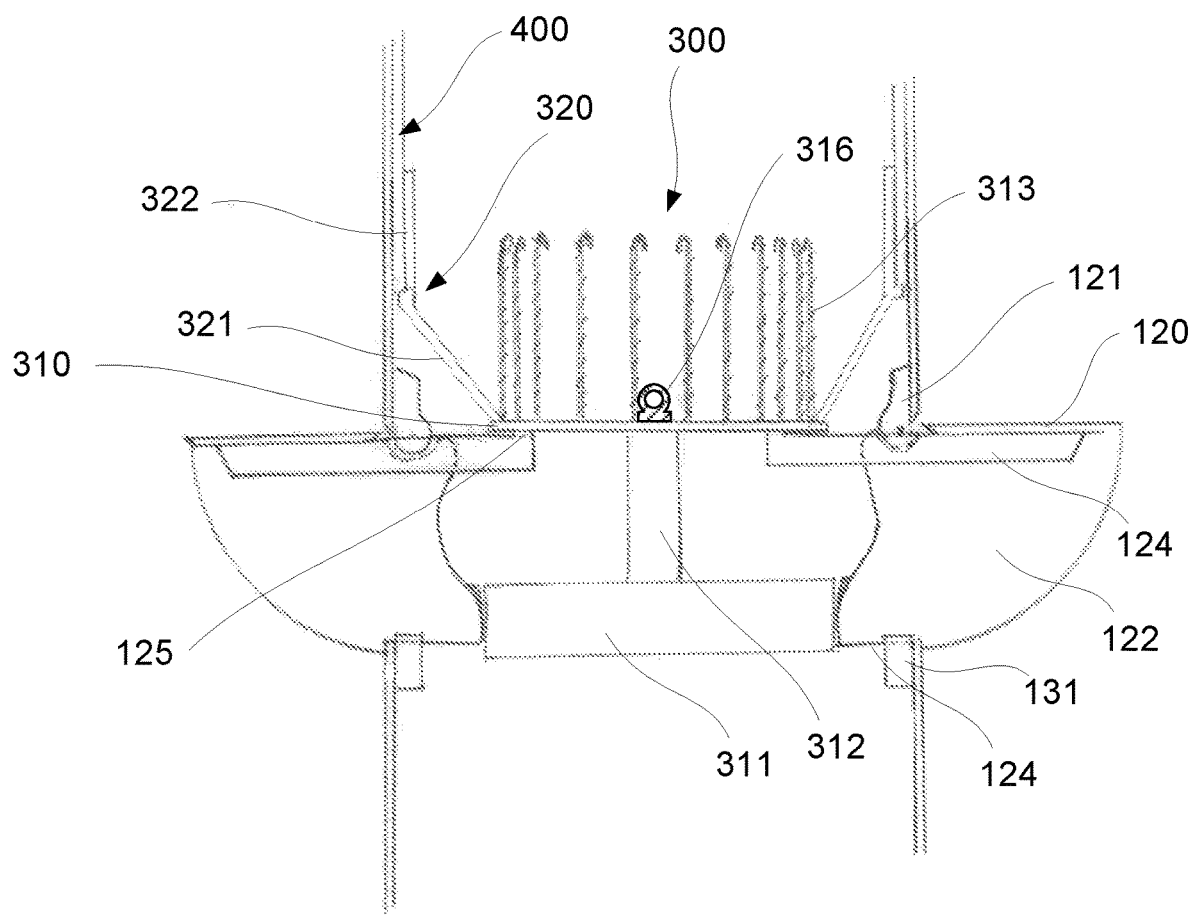
FIG. 6 is a principle drawing of a locking device according to the disclosure.

In lower end of the recess 130 there is arranged a guide groove or recess 131, as shown in FIGS. 3C and 3D, which is adapted the mentioned main support element 122, such that the main support element 122 may move in the mentioned guide groove or recess 131 when the wing 120 is moved from closed condition to deployed position. Alternatively or in addition, there is arranged a block or ring 132 with a corresponding guide groove for the same purpose at lower end of the recess 130, as shown in FIGS. 4, 5A and 6.

As shown in FIGS. 4, 5A, 6 and 9, the rear part of the support element 122 is provided with a notch, constriction or recess 123 determining the number of degrees the wing 120 is to exhibit in relation to the main tube 110 in deployed condition. The wing 120 is arranged such that, when the wing 120 is moved to deployed condition with desired angle, the notch, constriction or recess 123 will come into engagement with the exterior surface of the main tube 110, so that the wing 120 becomes locked in this position. This is achieved by that the wing 120 is allowed a short movement in longitudinal direction of the main tube 110 after it is moved out through the recess 130.

According to one embodiment of the anchor assembly 100, the wings 120 are further provided with two additional support elements 124 arranged on each side of the main support element 122, as shown in FIGS. 2, 3A, 3B, 4-6 and 9. The support elements 124 extend in longitudinal direction at rear side of the wing 120 and further have an extension in longitudinal direction that is longer than the wing 120, so that they exhibit a part thereof extending beyond the wing 120 in a direction upwards in the main tube 110, when the wing 120 is closed position, and horizontally inwards towards the center of the main tube 110, when the wings are in deployed position, but not in contact with support elements 124 from an opposite wing 120.

As shown in FIGS. 4-6 and 9, the support elements 124 will be adapted desired angle for deployment of the wing 120, such that, when the wing 120 is in deployed position with desired angle, the support elements 124 are positioned horizontally interior the main tube 110. As, e.g., shown in FIGS. 5A and 5B, when the wings 120 is to have a deployed position of 45 degrees, the support elements 124 are arranged to rear side of the wing 120 with a contact surface of 45 degrees, such that when the wing 120 is moved to deployed position, they are positioned horizontally interior the main tube 110.

The support elements 124 are further arranged with a distance between them allowing insertion of a hammer head 520 of a hammer 500 which is to move the wings 120 from closed position to deployed position, as shown in FIGS. 3B, 8A-8C and 9, which will be described in further detail below.

Reference is now made to FIGS. 2 and 6 showing a principle drawing seen from above and a cross-sectional view, respectively, of the anchor assembly 100. The mentioned horizontal position of the support elements 124 is adapted to form an engagement surface for a locking device 300, locking the wings 120 in deployed position, which locking device 300 is shown in FIGS. 2 and 6.

The disclosed locking device 300 is formed by a disc-shaped locking plate 310 having an exterior circumference being smaller than interior circumference of the main tube 110 and being larger than the distance between the mentioned support elements 124 when these are in horizontal position, which locking plate 310 is arranged to bear against the mentioned support elements 124 when these are in horizontal position and by that lock the wings 120 in deployed position via the support elements 124.

According to a further embodiment of the locking device 300, it further comprises a lock block 311 arranged to lower side of the mentioned locking plate 310 via connection element 312, positioning the lock block 311 at a distance from the locking plate 310, such that the lock block 311 is positioned between the main support elements 122 of diagonally opposite wings 120 when these are in deployed position. The lock block 311 accordingly has an extension in longitudinal direction corresponding to the main support elements 122, depending on the angle of the wings 120 in deployed position, of two diagonally opposite wings 120 for therethrough to lock the wings 120 from forcing back into the main tube 110 at extreme loads. The lock block 311 has a width adapted the distance between the mentioned support elements 124 so that it can be guided down between these and into engagement with the mentioned main support elements 122.

According to a further embodiment, the locking plate 310 at upper side thereof is provided with upwards protruding reinforcing elements 313 extending perpendicularly upwards from the mentioned locking plate 310. The mentioned reinforcing elements 313 extend a desired distance upwards in the main tube 110 where they end in a hook-shape for improved attachment in concrete filled in the main tube 110 after the anchor assembly 100 has been installed into the seabed.

According to a further embodiment of the locking plate 310 it is provided with at least one through hole 314 for preventing air from being captured under the locking plate 310 when concrete is filled in the main tube 110 and flowing down along the sides and through the hole(s) 314 and under the locking plate 310, and filling concrete around the wings 120 and the elements of the wings 120.

Further, the mentioned support elements 124 at free end thereof may be provided with upwards protruding elements 125, as shown in FIGS. 2 and 6, and the locking plate 310 may be provided with adapted holes 315, adapted for receiving the mentioned upwards protruding elements 125. This provides improved positioning of the locking plate 310, at the same time as one achieves secure arrangement thereto. These holes 315 may further have a free space to the mentioned upwards protruding elements 125, allowing concrete being filled into the main tube 110 to flow through the locking plate 310.

For handling of the mentioned locking device 300 it may further be provided with connection means 316, such as a hook, arranged to upper side of the locking plate 310, enabling handling of the locking device 300 with suitable means, such as a crane or similar for guiding it into place down in the anchor assembly 100.

The locking plate 310 together with the lock block 311 further prevent the wing 320 from being ripped out at the hinged area at upper part of the recess 130 at extreme loads.

Figure 7:
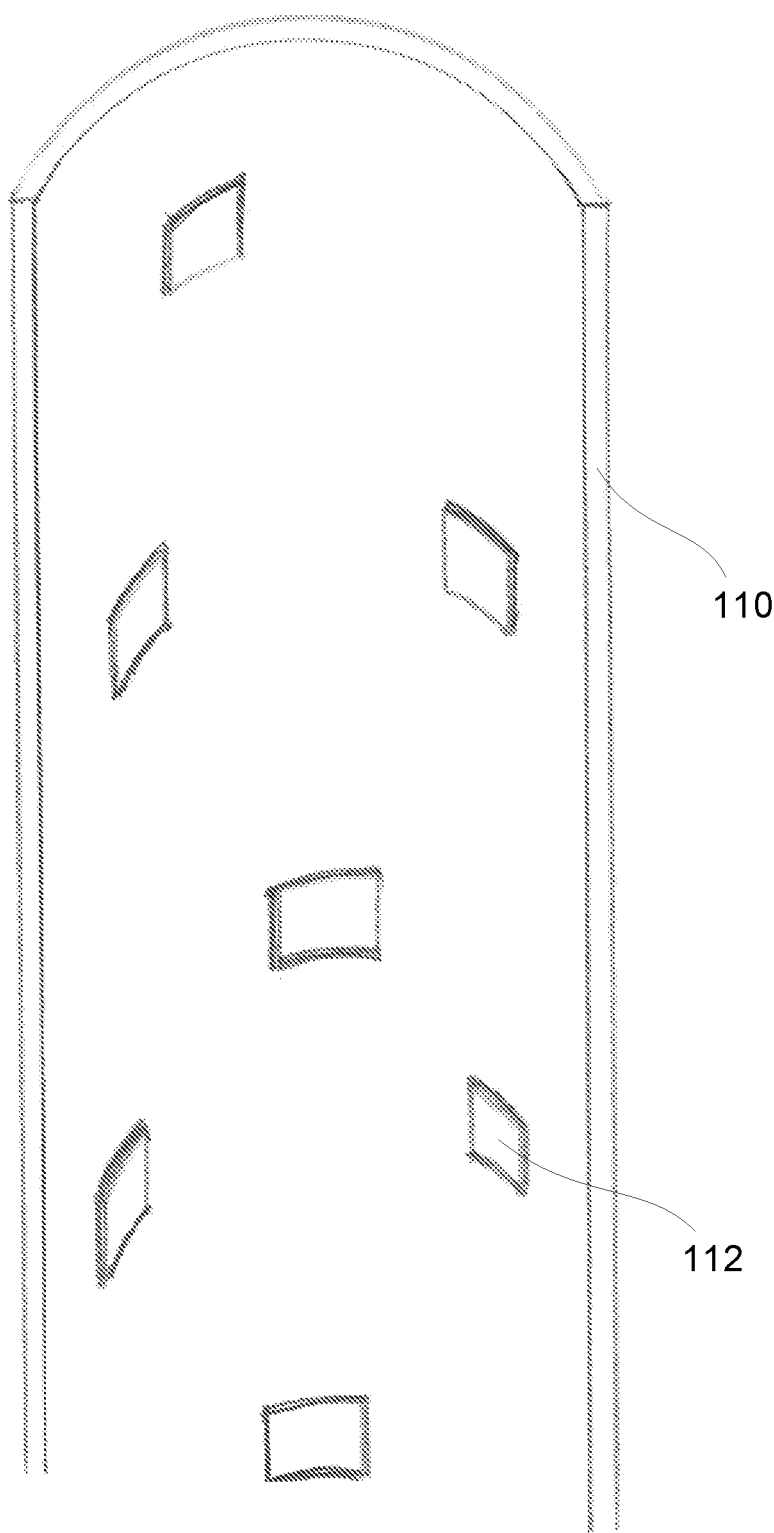
FIG. 7 is a principle drawing of a further embodiment of the main tube according to the disclosure.

Reference is now made to FIG. 7 showing a further embodiment of the main tube 110, where the main tube 110 interiorly is provided with a number of small protruding elements 112 distributed around on the inner surface of the main tube 110 to prevent concrete filled in the main tube from sliding out at extreme loads.

Figure 8A:
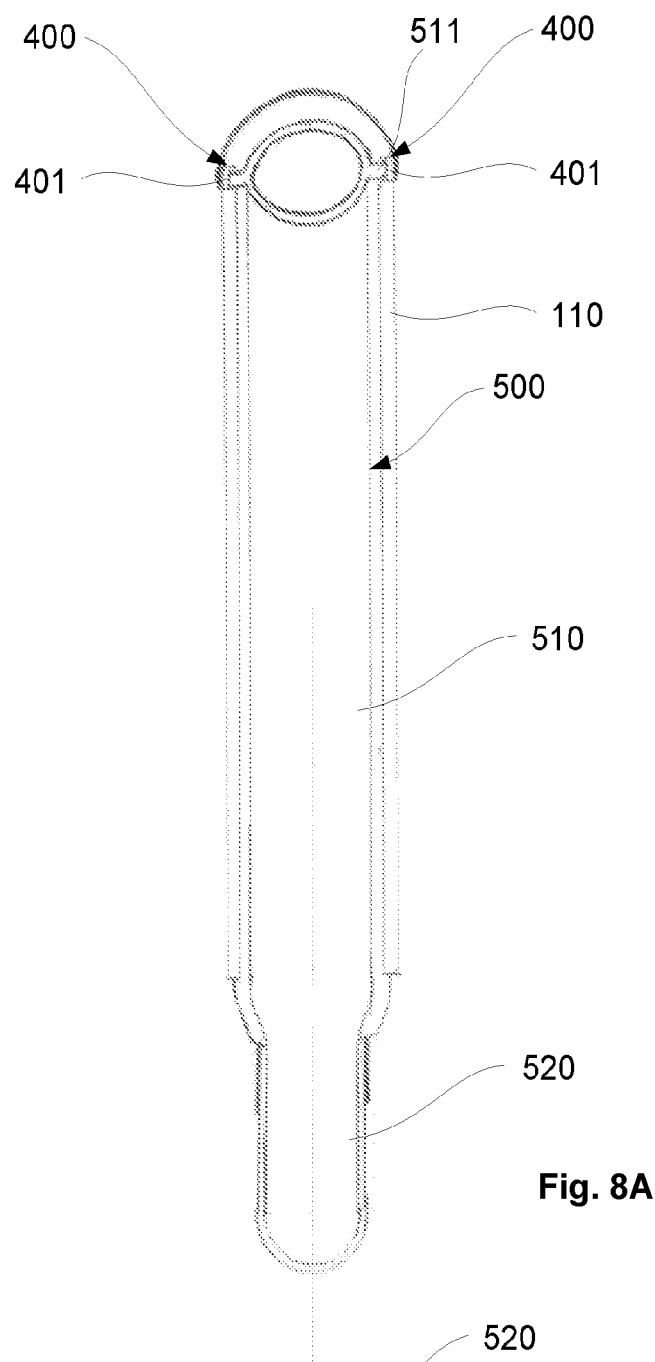
FIGS. 8A-8C are principle drawings of a hammer, and guide means in the main tube.

Reference is now made to FIGS. 6 and 8A showing a further embodiment of the main tube 110. According to one embodiment of the main tube 110, it is provided with guide means 400 extending in longitudinal direction of the main tube 110, at interior surface thereof. The guide means 400 is preferably formed by at least a track, guide groove, slot or recess 401 arranged in interior surface of the main tube 110, alternatively at least one elevation arranged on interior surface of the main tube 110. The guide means 400 are extending in longitudinal direction almost entirely down to the wings 120.

In the shown example in FIGS. 6 and 8A there are two such guide means 400 arranged diagonally interior in the main tube 110. The guide means 400 may be used to guide the locking plate 310 in correct position downwards in the main tube 110 and/or guiding a hammer 500 in correct position downwards to knock out the wings 120.

Reference is now made to FIG. 6. According to a further embodiment of the locking device 300 it is provided with guide means 320 adapted for engagement with the mentioned guide means 400, enabling accurate positioning of the locking device 300 in relation to the wings 120. The guide means 320 is, e.g., formed by one or more elements 321 extending from upper side of the locking plate 310, upwards and outwards to the mentioned guide means 400 and exhibiting an engagement surface 322 allowing the locking device 300 to slide downwards the main tube 110 along the guide means 400.

Figure 8B:
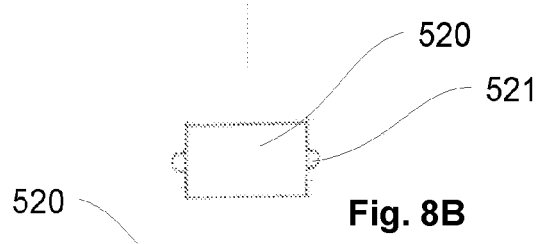
Figure 8C:
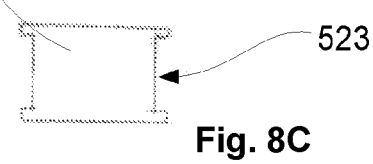

Reference is now made to FIGS. 8A-8C showing principle drawings of a hammer 500 for knocking out the wings 120 from closed position to deployed position. The hammer 500 is formed by an elongated tubular main body 510 and a hammer head 520 at lower end adapted for engagement with the wings 120. The tubular main body 510 exhibits an exterior diameter adapted the interior diameter of the main tube 110, and is provided with longitudinal protruding elements 511 or longitudinal slots or recesses adapted the guide means 400.

The hammer head 520 has a cross-sectional shaped, e.g. as shown in FIGS. 8B and 8C, adapted the support elements 122 and 124 of the wings 120, such that the hammer head 520 can be guided between the support elements 124 and into engagement with the main support element 122 to knock the wings 120 out from the main tube 110 and to deployed position with desired angle. The hammer head 520 further has a width adapted the distance between the main support elements 122 after the wings 120 have been knocked out with desired angle. In other words, the hammer head 520 forms a key knocking out the wings 120 to desired angle. The hammer head 520 further has a rounded shape. By a cross-sectional shape as shown in FIG. 8B, where the hammer head 520 exhibits centrally protruding elements 521, the main support element 122 will be provided with a corresponding recess 522. By a cross-sectional shape as shown in FIG. 8C, where the hammer head 520 exhibits centrally slots or recesses 523, these will be adapted the width of the main support elements 122. This will provide a controlled passing of the hammer head 520 past the main support elements 122 of the wing 120 after it has been knocked out.

Figure 9:
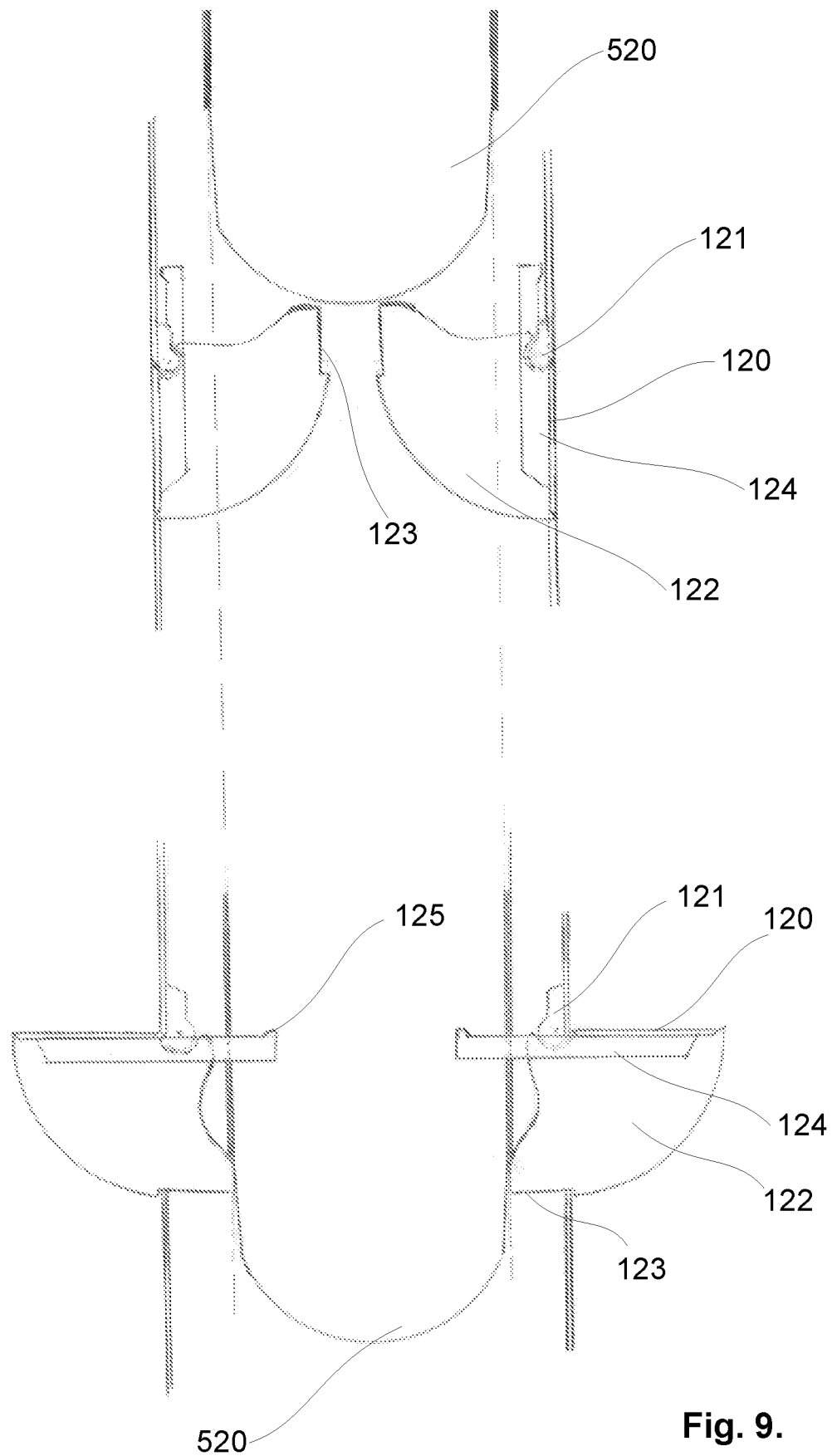
FIG. 9 is a principle drawing of the use of a hammer according to the disclosure to move the wings to deployed position with desired angle.

As shown in FIG. 9, the hammer 500 is guided down in the main tube 110 where the hammer head passes the support elements 124 by its shape and comes into engagement with the main support element 122. By applying force on the hammer 500 with a suitable actuator, further movement of the hammer 500 downwards in longitudinal direction will move the wings 120 out to deployed position and when the hammer head 520 passes the mentioned main support elements 122, the wings 120 will then be moved to deployed position with desired angle as shown in FIGS. 2, 3B, 6 and 9, where there is an angle of 90 degrees, or, e.g., as in FIG. 5B, where the angle is 45 degrees.

In other words, disclosed embodiments work by that one press or knocks the main tube 110, with its foldable wings 120 positioned in closed position, into the ground/seabed by means of a suitable actuator, such as a vibratory hammer of prior art connected to the main tube 110. Prior to starting the insertion into the ground/seabed, the main tube 110 is positioned such that the resistance plate 220 is positioned in pulling direction of anchoring means (not shown) to be attached to the anchor assembly 100 after installation in the ground/seabed. After the main tube 110 is in place at desired depth, the hammer 500 is guided down in the main tube 110 and into engagement with the wings 120, as shown in FIG. 9, after which the hammer 520 is pressed or knocked further down in the tube by a suitable actuator, such as a vibratory hammer of prior art, until the wings 120 are moved out and into surrounding masses with a desired angle, as shown in FIGS. 2, 3B, 5B, 6 and 9.

The mentioned hammer 500 is next retrieved from the main tube 110 followed by insertion of the locking device 300, if required, to lock the wings 120 in deployed position.

Next, there is arranged further reinforcing means 600, such as reinforcing rods, as shown in FIG. 2, extending in longitudinal direction of the main tube 110, if needed. Reinforcing like this will reinforce and increase the bending resistance of the main tube 110.

When this is in place, the lid 140 is arranged and fixed, after which the main tube 110 is filled with concrete.

In this manner there is provided an anchor assembly 100 being robust and which ensures sufficient resistance force against forces acting upwards on the anchor assembly 100, and that at the same time is arranged to handle extreme pressure and tension loads.

The invention claimed is:

1. An anchor assembly for arrangement in a seabed, comprising:
   a main tube provided with foldable wings which are each movably arranged in a respective recess of the main tube via a hinged engagement in an upper end of the respective recess, each wing being aligned with an outer surface of the main tube in an initial position;
   each wing being provided with a centered curved main support element extending in a plane perpendicular to an inner surface;
   a rear part of the main support element being provided with a notch, constriction or recess for determining an angle in relation to the main tube in a deployed state;
   each wing being further provided with two additional support elements arranged on opposite sides of the main support element;
   the additional support elements extending in a longitudinal direction on a rear side and having an extension in the longitudinal direction that is longer than that of each wing such that each of the additional support elements includes a part thereof that extends beyond the wing in a direction upwards in the main tube when the wings are in the initial position, and horizontally inwards towards a center of the main tube when the wings are in the deployed state, but not in contact with the additional support elements of the wing oppositely arranged.

2. The anchor assembly of claim 1, wherein, in the deployed state, when the notch, constriction or recess engages the outer surface of the main tube, a locking state results.

3. The anchor assembly of claim 1, wherein, in the deployed state, the main support elements are positioned horizontally interior of the main tube and form an engagement surface for a locking device.

4. The anchor assembly of claim 1, wherein the additional support elements are arranged to have a distance between them that allows insertion of a head of a hammer configured to move the wings to the deployed state.

5. The anchor assembly of claim 1, further comprising a locking device arranged for locking the wings in the deployed state.

6. The anchor assembly of claim 5, wherein the locking device comprises a disc-shaped locking plate having an exterior circumference that is smaller than an inner circumference of the main tube and is larger than a distance between the support elements when the additional support elements are in the horizontal position, and the locking plate is arranged to bear against the additional support elements when the additional support elements are in the horizontal position to thereby lock the wings in the deployed state.

7. The anchor assembly of claim 6, wherein the locking device further comprises a lock block arranged to a lower side of the locking plate via a connection element positioning the lock block at a distance from the locking plate such that the lock block is positioned between the main support elements when in the deployed state.

8. The anchor assembly of claim 6, wherein the lock block has an extension in the longitudinal direction, the lock block having a width adapted to the distance between the support elements so that the lock block can be guided down between and into engagement with the main support elements.

9. The anchor assembly of claim 6, wherein the locking plate at an upper side is provided with upwards protruding reinforcing elements extending perpendicularly upwards from the locking plate.

10. The anchor assembly of claim 6, wherein the locking plate is provided with at least one through hole to prevent air from being captured below the locking plate when concrete is filled in the main tube.

11. The anchor assembly of claim 1, wherein the main tube is provided with a number of protruding elements in an interior distributed around on the inner surface of the main tube to prevent concrete filled in the main tube from sliding out at extreme loads.

12. The anchor assembly of claim 1, wherein:

the main tube comprises one or more guides extending in the longitudinal direction of the main tube at inner surface thereof;

a locking device;

the one or more guides are configured to guide the locking device.

13. The anchor assembly of claim 1, further comprising anti-pressure device extending in the longitudinal direction of the elongated main tube and anti-tension device extending in the longitudinal direction of the elongated main tube, wherein the anti-pressure device and the anti-tension device are arranged diagonally to the elongated main tube.

14. The anchor assembly of claim 1, further comprising a resistance plate arranged at an upper part of the main tube, wherein the resistance plate is arranged in a parallel vertical plane of the main tube and has an extension in a width direction that is longer than a diameter of the main tube.

15. The anchor assembly of claim 1, further comprising a lid detachably arranged on the upper end of the main tube, wherein the lid includes at least one hole for filling of concrete into the main tube and an anchoring hook is arranged on the lid.

16. The anchor assembly of claim 1, further comprising hooks for handling the anchor assembly in connection with deployment from an installation vessel and for adjustment of a position of the anchor assembly into a seabed.

17. The anchor assembly of claim 1, further comprising a hammer for pushing out the wings from the initial position to the deployed state, the hammer having an elongated main body and a hammer head at a lower end adapted for engagement with the wings.

18. The anchor assembly of claim 17, wherein the hammer head has a cross-sectional shape adapted to the main and additional support elements such that the hammer head can be guided between the additional support elements and into engagement with the main support elements to push out the wings from the main tube to the deployed state.

19. The anchor assembly of claim 17, wherein the hammer head has a width adapted to a distance between the main support elements after the wings have been pushed out to the deployed state.

* * * * *